(12) United States Patent
Martens

(10) Patent No.: US 10,060,667 B2
(45) Date of Patent: Aug. 28, 2018

(54) WASTE AIR FLOW CAPTURE SYSTEM

(71) Applicant: Perry Lynn Martens, Coombs (CA)

(72) Inventor: Perry Lynn Martens, Coombs (CA)

( * ) Notice: Subject to any disclaimer, the term of this patent is extended or adjusted under 35 U.S.C. 154(b) by 105 days.

(21) Appl. No.: 15/165,256

(22) Filed: May 26, 2016

(65) Prior Publication Data

US 2017/0343268 A1 Nov. 30, 2017

(51) Int. Cl.
*F25D 17/06* (2006.01)
(52) U.S. Cl.
CPC .................................. *F25D 17/06* (2013.01)
(58) Field of Classification Search
CPC ........... F25D 17/06; F01K 23/068; F03D 9/00
USPC ...................................................... 290/44, 55
See application file for complete search history.

(56) References Cited

U.S. PATENT DOCUMENTS

| | | | |
|---|---|---|---|
| 3,247,407 A * | 4/1966 | Henri Bruneel Camille | H02K 53/00 310/155 |
| 6,365,985 B1 | 4/2002 | Cohen | |
| 7,112,893 B1 * | 9/2006 | Villanueva | F01K 23/068 290/44 |
| 8,564,148 B1 | 10/2013 | Novak | |
| 9,103,320 B1 | 8/2015 | Potts et al. | |
| 9,260,975 B2 | 2/2016 | Schuler | |
| 2008/0188174 A1* | 8/2008 | Aminpour | F03D 1/04 454/309 |
| 2009/0146425 A1* | 6/2009 | Widisky | F03D 9/00 290/44 |
| 2009/0250933 A1* | 10/2009 | Delf | F02B 41/10 290/52 |
| 2010/0244455 A1 | 9/2010 | Berginc | |
| 2011/0089701 A1 | 4/2011 | Blake | |
| 2011/0204646 A1* | 8/2011 | Farrell | F03D 9/003 290/54 |
| 2012/0146338 A1* | 6/2012 | Teglia | F03D 9/25 290/55 |
| 2012/0280503 A1* | 11/2012 | Mahawili | F03D 9/00 290/52 |
| 2014/0196446 A1* | 7/2014 | Holley | F03D 9/25 60/398 |
| 2014/0356167 A1* | 12/2014 | Schuler | F01D 15/10 416/91 |

FOREIGN PATENT DOCUMENTS

WO 2011058396 5/2011

* cited by examiner

*Primary Examiner* — Sean Gugger
(74) *Attorney, Agent, or Firm* — Richard D. Okimaw

(57) ABSTRACT

A waste air flow capture system, comprising: a) a cylindrical shroud configured to receive a waste air flow from a waste air flow channel of an HVAC compressor or a heat pump compressor and configured to vent the waste air flow received from the waste air flow channel of an HVAC compressor or a heat pump compressor; b) a first electrical generator configured to generate electricity when a first fan blade assembly rotates relative to the cylindrical shroud and/or a second electrical generator configured to generate electricity when a first fan blade assembly rotates relative to the cylindrical shroud; and d) a first fan blade assembly enclosed by the cylindrical shroud and coupled to the first electrical generator motor on a first side of the first fan blade assembly and coupled to the second electrical generator motor on a second side of the first fan blade assembly.

19 Claims, 9 Drawing Sheets

WASTE AIR FLOW CAPTURE SYSTEM

FIELD OF THE INVENTION

The present disclosure is in the field of passive energy capture systems pertaining to capturing wasted air flow.

BACKGROUND OF THE DISCLOSURE

Air conditioning systems employ a condenser unit which is a necessary component for air conditioning systems to produce cool air. During operation, the condenser unit produces exhaust air that is vented into the atmosphere. In another aspect, wind turbines passively produce electricity by being vertically deployed in areas with high winds.

There is need for an efficient system or kit for capturing vented waste air that can be efficiently mounted to condenser units and heat pumps to capture wasted exhaust air vented during the operation air conditioning system, which transfers to mechanical energy into electrical power.

SUMMARY OF THE INVENTION

Disclosed herein is a waste air flow capture system, comprising: a) a cylindrical shroud configured to receive a waste air flow from a waste air flow channel of an HVAC compressor or a heat pump compressor and configured to vent the waste air flow received from the waste air flow channel of an HVAC compressor or a heat pump compressor; b) a first electrical generator configured to generate electricity when a first fan blade assembly rotates relative to the cylindrical shroud and/or a second electrical generator configured to generate electricity when a first fan blade assembly rotates relative to the cylindrical shroud; d) a first fan blade assembly enclosed by the cylindrical shroud and coupled to the first electrical generator motor on a first side of the first fan blade assembly and coupled to the second electrical generator motor on a second side of the first fan blade assembly; and e) a second electrical generator bracket capable of holding the second electrical generator, wherein the first fan blade assembly is configured to rotate the first electrical generator and/or the second electrical generator simultaneously from opposed sides of a hub of the first fan blade assembly.

In another aspect, disclosed herein is a waste air flow capture system kit, comprising: a) a cylindrical shroud configured to receive a waste air flow from a waste air flow channel of an HVAC compressor or a heat pump compressor and configured to vent the waste air flow received from the waste air flow channel of an HVAC compressor or a heat pump compressor; b) a first electrical generator configured to generate electricity when a first fan blade assembly rotates relative to the cylindrical shroud and/or a second electrical generator configured to generate electricity when a first fan blade assembly rotates relative to the cylindrical shroud; c) a first fan blade assembly enclosed by the cylindrical shroud and coupled to the first electrical generator motor on a first side of the first fan blade assembly and coupled to the second electrical generator motor on a second side of the first fan blade assembly; d) a second fan blade assembly configured to transmit waste air flow from a waste air flow channel of an HVAC compressor or a heat pump compressor; and e) a second electrical generator bracket capable of holding the second electrical generator.

In another aspect, disclosed herein is a method of passively generating electric power by recycling waste air flow received from a waste air flow channel of an HVAC compressor or a heat pump compressor with the waste air flow capture system, comprising the steps of: a) removing an HVAC compressor's or a heat pump compressor's fan shroud; b) replacing an HVAC compressor's or a heat pump compressor's fan blade assembly with a second fan blade assembly; c) installing a waste air flow capture system on a waste air flow channel of an HVAC compressor or a heat pump compressor, wherein a cylindrical shroud of the waste air flow capture system is facing away from the HVAC compressor or a heat pump compressor; d) using waste air flow from the channel of the HVAC compressor or the heat pump compressor to drive a first fan blade assembly and convert the wind energy into a mechanical energy which is converted further into electrical power; and e) converting the electric power with an electrical power converter for converting DC to AC and for outputting electric power output.

In yet another aspect, disclosed herein is a method of passively generating electric power by recycling waste air flow received from a waste air flow channel of an HVAC compressor or a heat pump compressor with the waste air flow capture system, comprising the steps of: a) removing an HVAC compressor's or a heat pump compressor's fan shroud; b) installing a waste air flow capture system on a waste air flow channel of an HVAC compressor or a heat pump compressor, wherein a cylindrical shroud of the waste air flow capture system is facing away from the HVAC compressor or a heat pump compressor; c) using waste air flow from the channel of the HVAC compressor or the heat pump compressor to drive a first fan blade assembly and convert the wind energy into a mechanical energy which is converted further into electrical power; and d) converting the electric power with an electrical power converter for converting DC to AC and for outputting electric power output.

In yet another aspect, disclosed herein is a method of passively generating electric power by recycling waste air flow received from a waste air flow channel of an HVAC compressor or a heat pump compressor with the waste air flow capture system, comprising the steps of: a) replacing an HVAC compressor's or a heat pump compressor's fan blade assembly with a second fan blade assembly; b) installing a fan shroud column configured to fit around a waste air flow channel of an HVAC compressor or a heat pump compressor; c) installing a waste air flow capture system on a waste air flow channel of an HVAC compressor or a heat pump compressor, wherein a cylindrical shroud of the waste air flow capture system is facing away from the HVAC compressor or a heat pump compressor; d) using waste air flow from the channel of the HVAC compressor or the heat pump compressor to drive a first fan blade assembly and convert the wind energy into a mechanical energy which is converted further into electrical power; and e) converting the electric power with an electrical power converter for converting DC to AC and for outputting electric power output.

In still another aspect, disclosed herein is a method of passively generating electric power by recycling waste air flow received from a waste air flow channel of an HVAC compressor or a heat pump compressor with the waste air flow capture system, comprising the steps of: a) installing a fan shroud column configured to fit around a waste air flow channel of an HVAC compressor or a heat pump compressor; b) installing a waste air flow capture system on a waste air flow channel of an HVAC compressor or a heat pump compressor, wherein a cylindrical shroud of the waste air flow capture system is facing away from the HVAC compressor or a heat pump compressor; c) using waste air flow from the channel of the HVAC compressor or the heat pump compressor to drive a first fan blade assembly and convert the wind energy into a mechanical energy which is converted further into electrical power; and d) converting the electric power with an electrical power converter for converting DC to AC and for outputting electric power output.

DETAILED DESCRIPTION OF THE EMBODIMENTS

Figure 1:
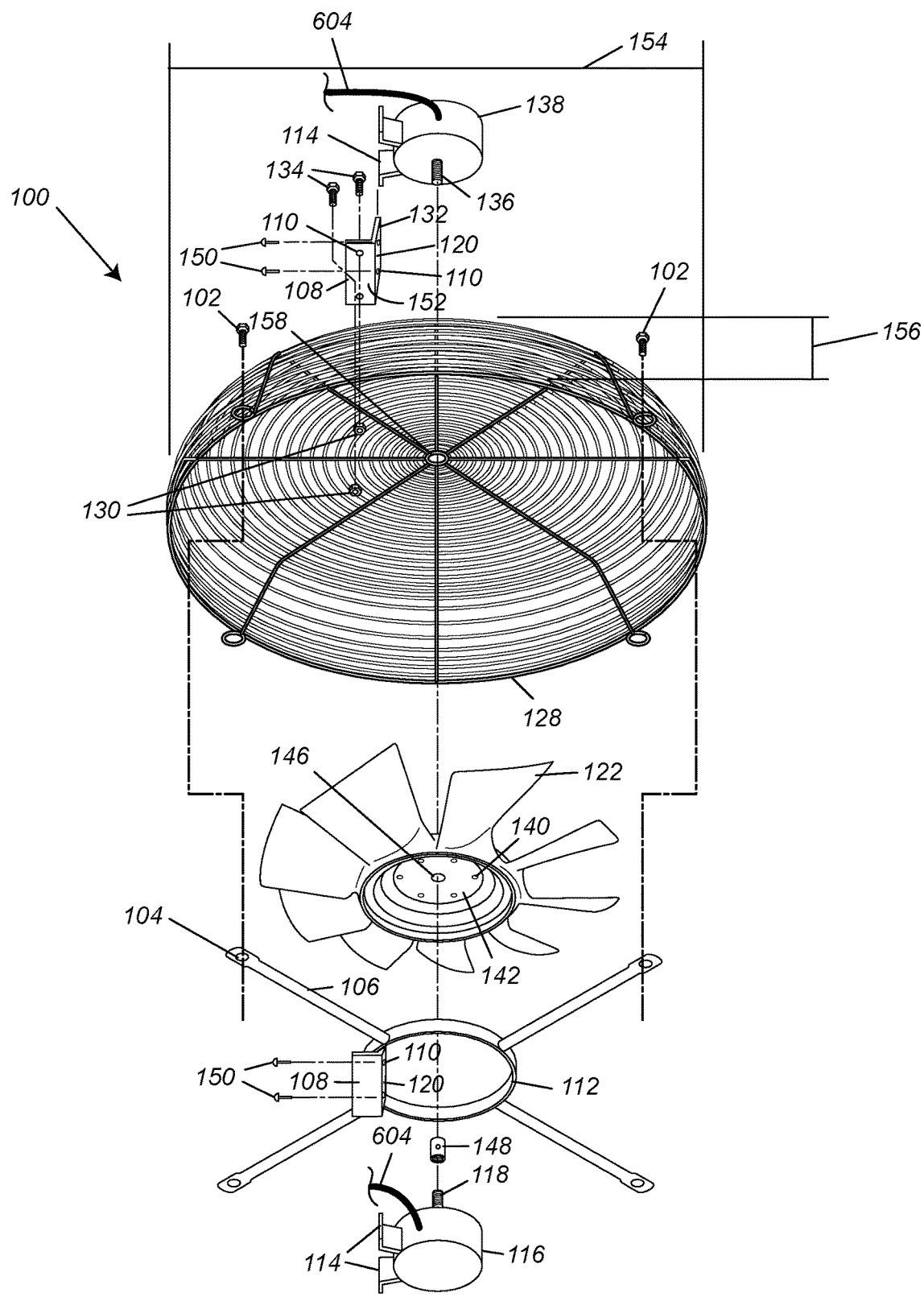
FIG. 1 is a exploded view of an embodiment of a waste air flow capture system 100 disclosed herein.

The following is a detailed description of certain specific embodiments of the waste air flow capture systems and methods disclosed herein.

In one aspect, disclosed herein is a waste air flow capture system, comprising: a) a cylindrical shroud configured to receive a waste air flow from a waste air flow channel of an HVAC compressor or a heat pump compressor and configured to vent the waste air flow received from the waste air flow channel of an HVAC compressor or a heat pump compressor; b) a first electrical generator configured to generate electricity when a first fan blade assembly rotates relative to the cylindrical shroud and/or a second electrical generator configured to generate electricity when a first fan blade assembly rotates relative to the cylindrical shroud; d) a first fan blade assembly enclosed by the cylindrical shroud and coupled to the first electrical generator motor on a first side of the first fan blade assembly and coupled to the second electrical generator motor on a second side of the first fan blade assembly; and e) a second electrical generator bracket capable of holding the second electrical generator, wherein the first fan blade assembly is configured to rotate the first electrical generator and the second electrical generator simultaneously from opposed sides of a hub of the first fan blade assembly, and wherein the HVAC compressor or a heat pump compressor comprises a second fan blade assembly configured to transmit wasted air flow from a waste air flow channel of an HVAC compressor or a heat pump compressor.

Referring to FIGS. 1-4 depict views of a waste air flow capture system 100 configured to receive a waste air flow from a waste air flow channel of an HVAC compressor or a heat pump compressor. The systems and methods disclosed pertain to generating electricity using unused exhaust air from heat dissipating equipment or ventilation from air conditioning equipment. In some embodiments, the system is configured to be bolted to a waste air flow channel of an HVAC compressor or the heat pump compressor. The components and design comprise a first electrical generator motor 138 and a second electrical generator motor 116 coupled to opposed sides of a first fan assembly comprising a plurality of first fan blades 122, a first fan assembly housing 144, a hub 142 affixed to the first fan assembly housing 144 with a plurality of bolts 140. In some embodiments, the first electrical generator and the second electrical generator each independently have a rated voltage in a range between about 12 volts and 48 volts. In some embodiments, the first electrical generator and the second electrical generator each independently have an output between about 100 W/h to 500 W/h. In some embodiments, the first electrical generator and the second electrical generator each comprises an alternating current, magnet, drive shaft, bearings, insulators and power wire terminals.

As illustrated, the first electrical generator motor 138 and the second electrical generator motor 116 comprise electrical generator motor feet 114, whereby the first electrical generator motor 138 and the second electrical generator motor 116 are affixed to L-brackets 132 and 108 respectively via bolts 150 and bracket holes 110. In some embodiments, the first electrical generator is affixed to a first electrical generator bracket with a plurality of welds, nuts and/or bolts. In some embodiments, the first electrical generator is affixed to a first electrical generator bracket with a plurality of welds, nuts and/or bolts, wherein the first electrical generator bracket is affixed to the cylindrical shroud with a plurality of welds, nuts and/or bolts. Moreover, L-bracket 132 may be bolted on a second side 152 to a top side of a cylindrical shroud 128 via nuts and bolts 130 and 134 and bracket holes 150, respectively.

Figure 2:
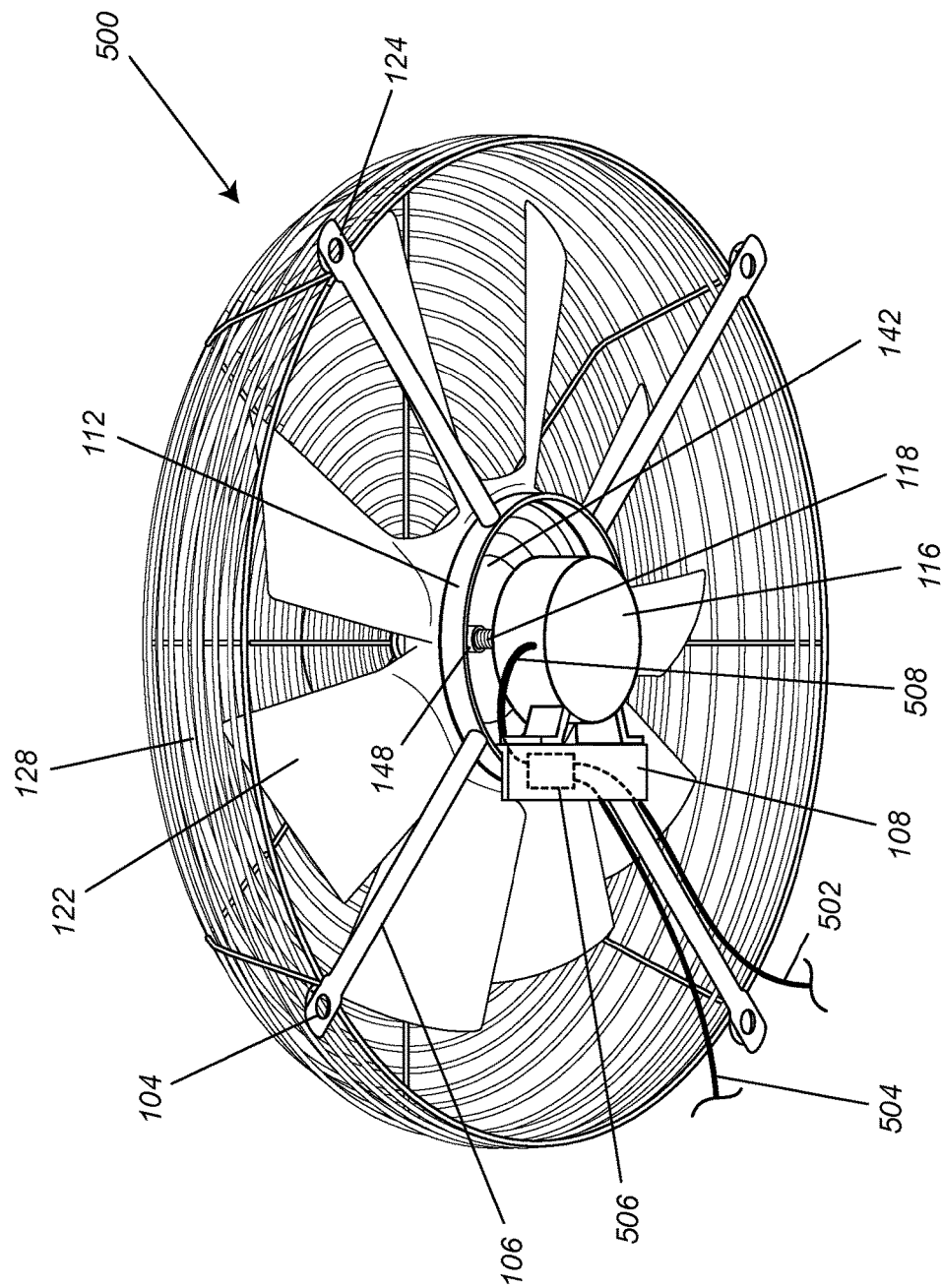
FIG. 2 is an illustration of a bottom side view of a single generator or dual generator waste air flow capture system 500 disclosed herein.

In some embodiments, a second electrical generator bracket comprises an L-bracket 108, a center ring portion 112 and a plurality of support arms 106 affixed to an outer portion of the center ring thereby forming an X-shape as illustrated with FIGS. 1 and 2. In some embodiments, the second electrical generator is affixed to a second electrical generator bracket with a plurality of welds, nuts and/or bolts. In some embodiments, the second electrical generator bracket comprises a center ring portion with a plurality of support arms affixed to an outer portion of the center ring thereby forming an X-shape. In some embodiments, the second electrical generator bracket comprises a center ring portion with a plurality of support arms affixed to the outer portion of the center ring, wherein a terminal end of one or more of the support arms comprises a support arm mounting aperture 104. In some embodiments, the second electrical generator bracket comprises a center ring portion with a plurality of support arms affixed to the outer portion of the center ring, wherein a terminal end of one or more of the support arms comprises a support arm mounting aperture, and wherein the cylindrical shroud comprises a plurality of cylindrical shroud mounting apertures each independently aligned a support arm mounting aperture. L-bracket 108 may be affixed to the center ring portion 112 whereby the second electrical generator motor 116 is affixed to a first side 120 of L-bracket 108 which positions the second electrical generator motor drive shaft 118 to be rotatably coupled with a hub channel 146. In some embodiments, wherein the waste air flow capture system further comprises that the second electrical generator drive shaft 136 is coupled to a second side of a hub 200 of the first fan blade assembly at an axial center position 146 of the hub 142.

As discussed, the first electrical generator motor 138 is affixed to a top side and an axial center position 158 of the cylindrical shroud 128 to be aligned with the hub channel 146. In some embodiments, wherein the waste air flow capture system further comprises that the first electrical generator drive shaft is coupled to a first side of a hub 300 of the first fan blade assembly at an axial center position 146 of the hub 142. In some embodiments, wherein the waste air flow capture system further comprises a first electrical generator drive shaft 118 and a second electrical generator drive shaft 136 are adjoined through hub channel 146 via a threaded coupling 148. In some embodiments, the second electrical generator drive shaft is adjoined to the hub through a hub channel via at least one threaded coupling 148 on a first side of the hub and/or a second side of the hub.

As depicted with FIGS. 1, 2, 3A and 3B, the cylindrical shroud 128 comprises a plurality of cylindrical shroud mounting apertures 124. In some embodiments, the system is configured to be bolted to a waste air flow channel of an HVAC compressor or the heat pump compressor. As depicted with FIG. 1, bolts 102 are aligned with cylindrical shroud mounting apertures 124 and support arm mounting apertures 104. In some embodiments, the cylindrical shroud 128 has a diameter 154 that is about 0.5 inches to about 6 inches larger than the waste air flow channel of the HVAC compressor or the heat pump compressor. In some embodiments, the cylindrical shroud 128 has a diameter 154 between about 24 inches and 30 inches and a height 156 between about 2 inches and 8 inches. In some embodiments, the cylindrical shroud mounting apertures 124 are separated by a distance between about 18 inches and 30 inches. In some embodiments, the cylindrical shroud 128 has a diameter 154 of about 27.5 inches and a height 156 of about 4.5 inches. In some embodiments, the cylindrical shroud mounting apertures 124 are separated by a distance of about 21 inches.

Turning to drawings, FIG. 2 is an illustration of a bottom side view of a single generator or dual generator waste air flow capture system 500 disclosed herein. As illustrated the assembled waste air flow capture system 500 depicts a serial wire 502 which connects the second electrical generator motor 138 and the second electrical generator motor 116 in series. Moreover, the positive and negative power wires 504 and 606 may be connected to a charge controller or rectifier, etc. In some embodiments, the first electrical generator and the second electrical generator are connected in series or in parallel. The bottom side of a waste air flow capture system 100 as depicted with FIG. 2 illustrates the second electrical generator bracket comprises an L-bracket 108, a center ring portion 112 and a plurality of support arms 106. The motor is centrally affixed to the bracket within the center ring portion 112 and coupled to the hub 142. In some embodiments, the first electrical generator and the second electrical generator each have a diameter less than a diameter of the first fan blade assembly. The plurality of support arms 106 are capable of supporting the waste air flow capture system 100 over a waste air flow channel of an HVAC compressor or a heat pump compressor while exposing the first fan assembly comprising a plurality of first fan blades 122 the waste air flow exiting the waste air flow channel of an HVAC compressor.

Figure 3A:
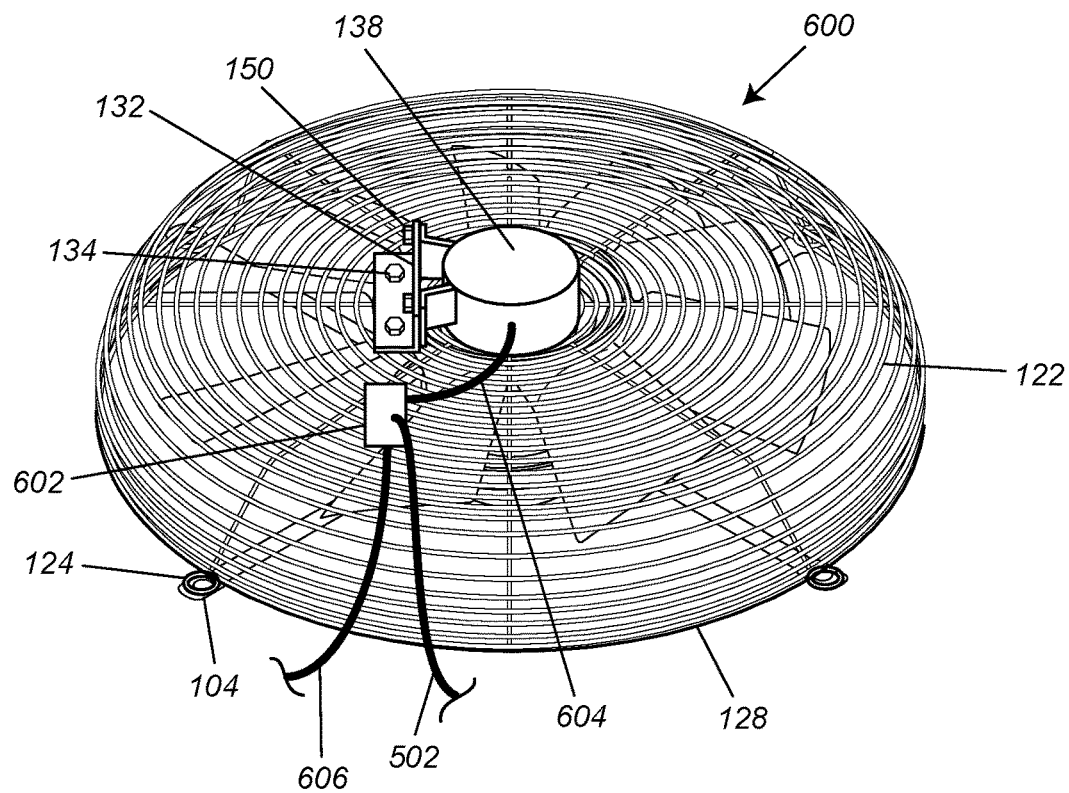
FIG. 3A is an illustration of a top side view of a dual generator waste air flow capture system 600 disclosed herein.

Turning to drawings, FIG. 3A is an illustration of a top side view of an assembled dual generator waste air flow capture system 600 disclosed herein. As illustrated the assembled waste air flow capture system 600 depicts a generator wire 604 which may be used to connect the generators in series and/or connect to a charge controller or rectifier, etc. The top side of a waste air flow capture system 100 as depicted with FIG. 3A illustrates the first electrical generator bracket comprises an L-bracket 132, bolts 150 and a nuts and/or bolts 134 which affix the L-bracket 132 to the axial center position 158 of the cylindrical shroud 128. The motor is centrally affixed to the bracket within the center ring portion 112 and coupled to the hub 142. The plurality of support arms 106 are capable of supporting the waste air flow capture system 100 over a waste air flow channel of an HVAC compressor or a heat pump compressor while exposing the first fan assembly comprising a plurality of first fan blades 122 the waste air flow channel.

Figure 3B:
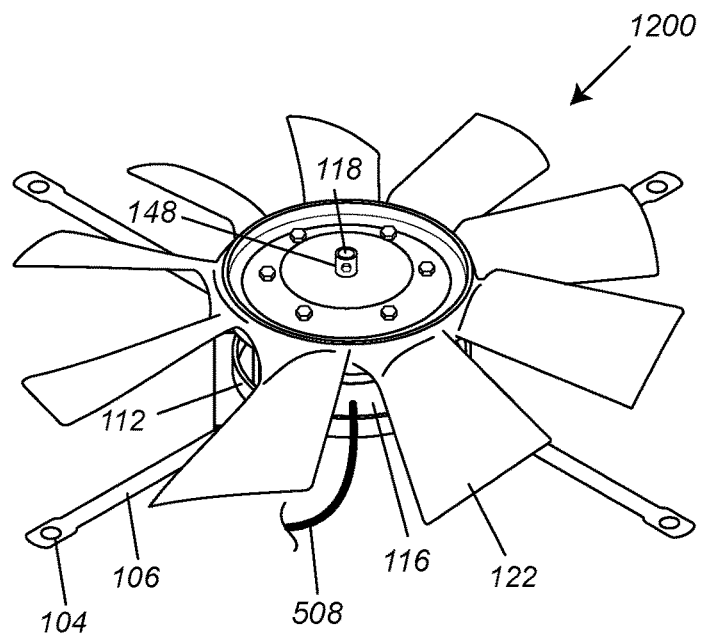
FIG. 3B is an illustration of a top side view of a single generator waste air flow capture system 1200 disclosed herein.

FIG. 3B depicts a top side of a single generator waste air flow capture system 1200 disclosed herein. In this view, the cylindrical shroud 128 is not shown to show the first electrical generator drive shaft 118 coupled to the hub 142 on a first side of a first fan blade assembly 300 via the hub channel 146 and the threaded coupling 148 being engaged with the threads of first electrical generator drive shaft 118. In this arrangement, the cylindrical shroud mounting apertures 124 of the cylindrical shroud 128 and support arm mounting apertures 104 are aligned for installation with bolts 102. Moreover, in this arrangement the single generator waste air flow capture system 1200 utilizes rectifier 602 and wires 504 and 606 of FIG. 2 as the positive and negative power wires from the rectifier.

Figure 4A:
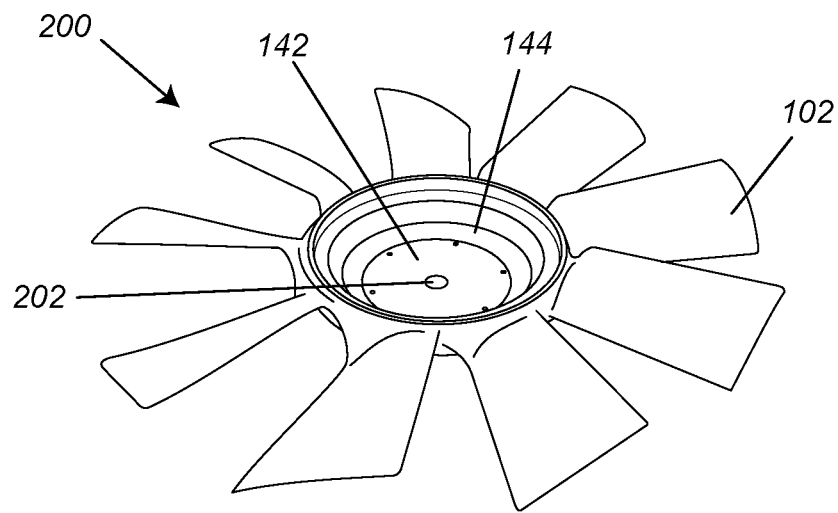
FIG. 4A is an illustration of a second side of a first fan blade assembly 200 disclosed herein.
Figure 4B:
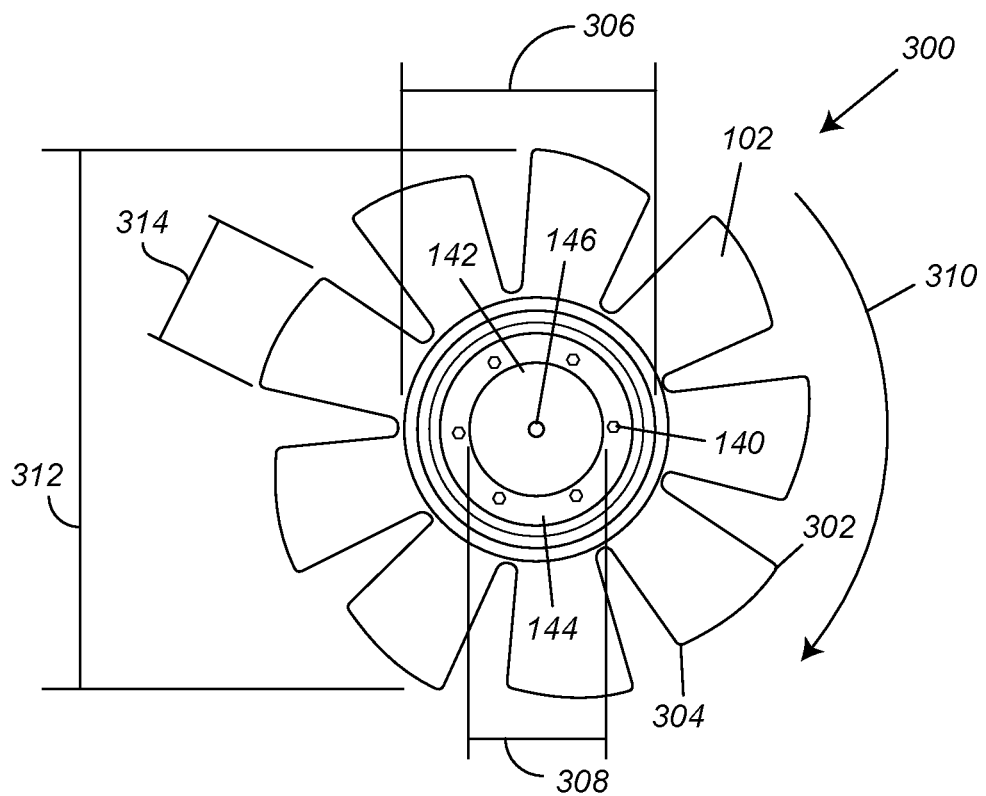
FIG. 4B is an illustration of a first side of a first fan blade assembly 300 disclosed herein.

Turning to FIG. 4A is an illustration of a second side of a first fan blade assembly 200 disclosed herein. As depicted, the second side of a first fan blade assembly 200 depicts the hub 142, a backside of the first fan blade assembly housing 144. The illustration shows a first side 202 of the hub channel 146 positioned in an axial center of the second side of a first fan blade assembly 200. FIG. 4B illustrates a first side of a first fan blade assembly 300 comprising the hub 142, hub channel 146, and a plurality of nuts and/bolts which affix the hub 142 to the first fan blade assembly housing 144. In some embodiments, the first fan blade assembly housing 144 has an inner diameter 308 of about 6 inches. In some embodiments, the first fan blade assembly housing 144 has an inner diameter 308 between about 4 inches and 8 inches. In some embodiments, a fan hub has a diameter 306 of about 11 inches. In some embodiments, a fan hub has a diameter 306 between about 8 inches and 20 inches. In some embodiments, the first fan blade assembly has a diameter less than the cylindrical shroud inner diameter of between about 0.1 inches to about 1 inch. In some embodiments, the width 314 of the plurality of first fan blades 122 is about 5⅞ inches. In some embodiments, the width 314 of the plurality of first fan blades 122 is between about 4 inches 10 inches. In some embodiments, the first fan blade assembly 300 has a diameter 312 of about 23 inches. In some embodiments, the first fan blade assembly 300 has a diameter 312 between about 18 inches and 24 inches. As illustrated, the first side of a first fan blade assembly 300 has a clockwise rotation of 310, and each first fan blades 122 has a first fan blade tailing edge 302 and a first fan blade leading edge 304 with a pitch angle of about 40 degrees and 9 first fan blades. In some embodiments, each first fan blades 122 has a first fan blade tailing edge 302 and a first fan blade leading edge 304 with a pitch angle between about 20 degrees and 60 degrees and between about 4 and 20 first fan blades. In some embodiments, the vertical between the first fan blade tailing edge 302 and the first fan blade leading edge 304 is about 2¼ inches. In some embodiments, the vertical between the first fan blade tailing edge 302 and the first fan blade leading edge 304 is between about 1½ inches and 10 inches. In some embodiments, the first fan blade assembly 300 is an automotive radiator cooling fan. In this aspect, automotive radiator cooling fans like the first fan blade assembly 300 are designed to pull air through a radiator, which is utilized with the waste air flow capture system 100 disclosed herein to maximize the second fan blade assembly's 400 venting of waste air flow. The first fan blade assembly 300 pulls air from the second fan blade assembly's 400 venting of waste air flow. The first fan blade assembly 300 is also weighted and balanced very precisely when manufactured in order to handle high rpm.

Figure 5:
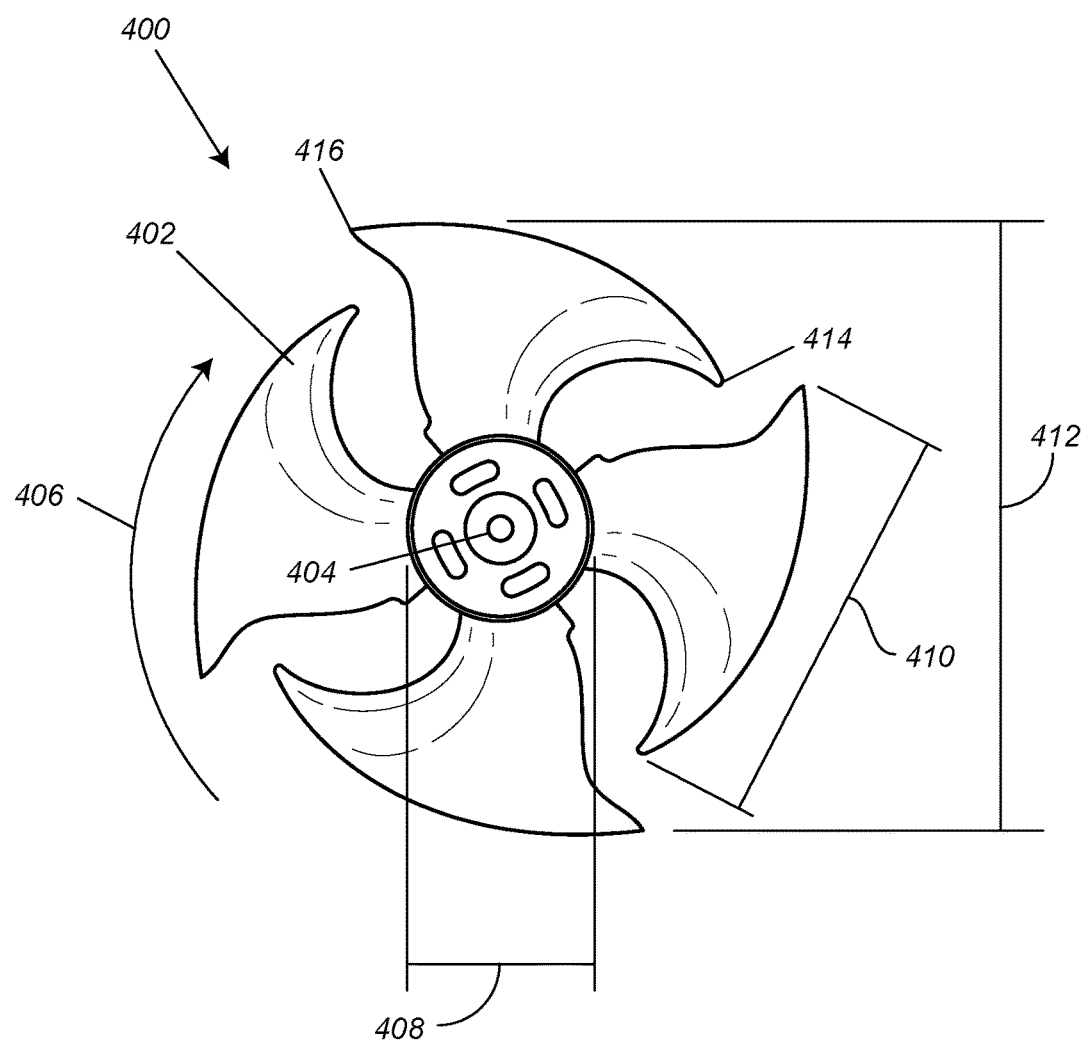
FIG. 5 is an illustration of a top side view of a second fan blade assembly 400 disclosed herein.

Turning to the drawings, FIG. 5 is an illustration of a top side view of a second fan blade assembly 400 disclosed herein. The second fan blade assembly 400 comprises a hub 404, a plurality of second fan blade assembly blades 402. In some embodiments, the second fan blade assembly hub 404 has a diameter 408 of about 6 inches. In some embodiments, the second fan blade assembly hub 404 has a diameter 408 between about 4 inches and 8 inches. In some embodiments, the width 410 of the plurality of second fan blades 402 is about 18 inches. In some embodiments, the width 410 of the plurality of second fan blades 402 is between about 8 inches and 22 inches. In some embodiments, the second fan blade assembly 400 has a diameter 412 of about 21 3/4 inches. In some embodiments, the second fan blade assembly 400 has a diameter 412 between about 18 inches and 22 inches. As illustrated, the first side of a second fan blade assembly 400 has a rotation of 406, and each second fan blades 402 has a second fan blade leading edge 414 and a second fan blade tailing edge 416 with a pitch angle of about 40 degrees and 4 first fan blades. In some embodiments, the pitch angle is between about 20 degrees and 60 degrees and between about 4 and 10 first fan blades. In some embodiments, the vertical between the second fan blade tailing edge 416 and the second fan blade leading edge 414 is about 6½ inches. In some embodiments, the vertical between the second fan blade tailing edge 416 and the second fan blade leading edge 414 is between about 2 inches and 8 inches. In operation, the top side view second fan blade assembly 400 represents the side of the fan blade that is facing the exiting air flow towards the waste air flow capture system 100 disclosed herein. The second fan blade assembly 400 is a wind propulsion style fan and pushes air away from the Air conditioning unit or heat pump. This second fan blade assembly 400 comprises four blades pitched for clockwise revolutions. The combination of pushing by the second fan blade assembly 400 and pulling of the first fan blade assembly 300 while facing each other creates the power generated as a result of these revolutions more than cancels the power needed to run the second fan blade assembly 400.

Figure 6A:
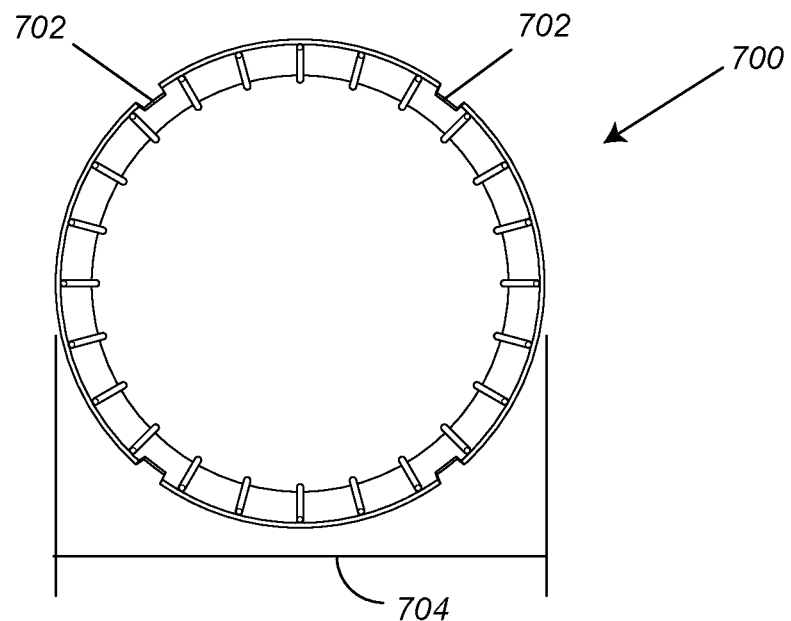
FIG. 6A is an illustration of a top view of a fan shroud column 700 disclosed herein.
Figure 6B:
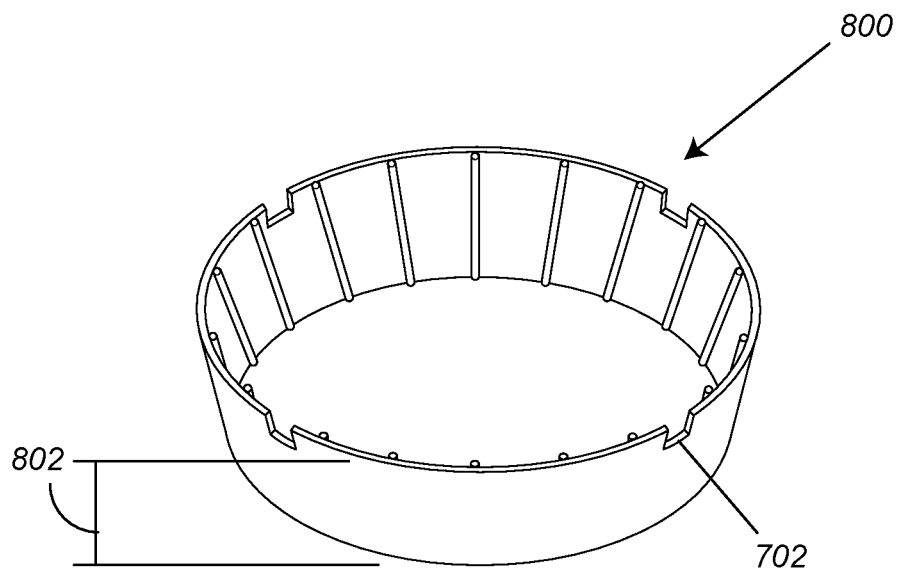
FIG. 6B is an illustration of a side view of a fan shroud column 800 disclosed herein.

FIG. 6A illustrates a top view of a fan shroud column 700 disclosed herein. The fan shroud column 700 has a diameter 704 of about 26 inches. In some embodiments, the fan shroud column 700 has a height 802 as depicted with FIG. 6B as a side view of the fan shroud column of about 7 inches. Installation of the waste air flow capture system 100 in some instances is requires utilizing the fan shroud column 700 is installed between the waste air flow capture system 100 and the HVAC compressor or a heat pump compressor. The fan shroud column depicted with FIGS. 6A and 6B comprise a plurality of fan column notches 702 spaced around the circumference to mate with the support arms 106 of the second electrical generator bracket.

Figure 7:
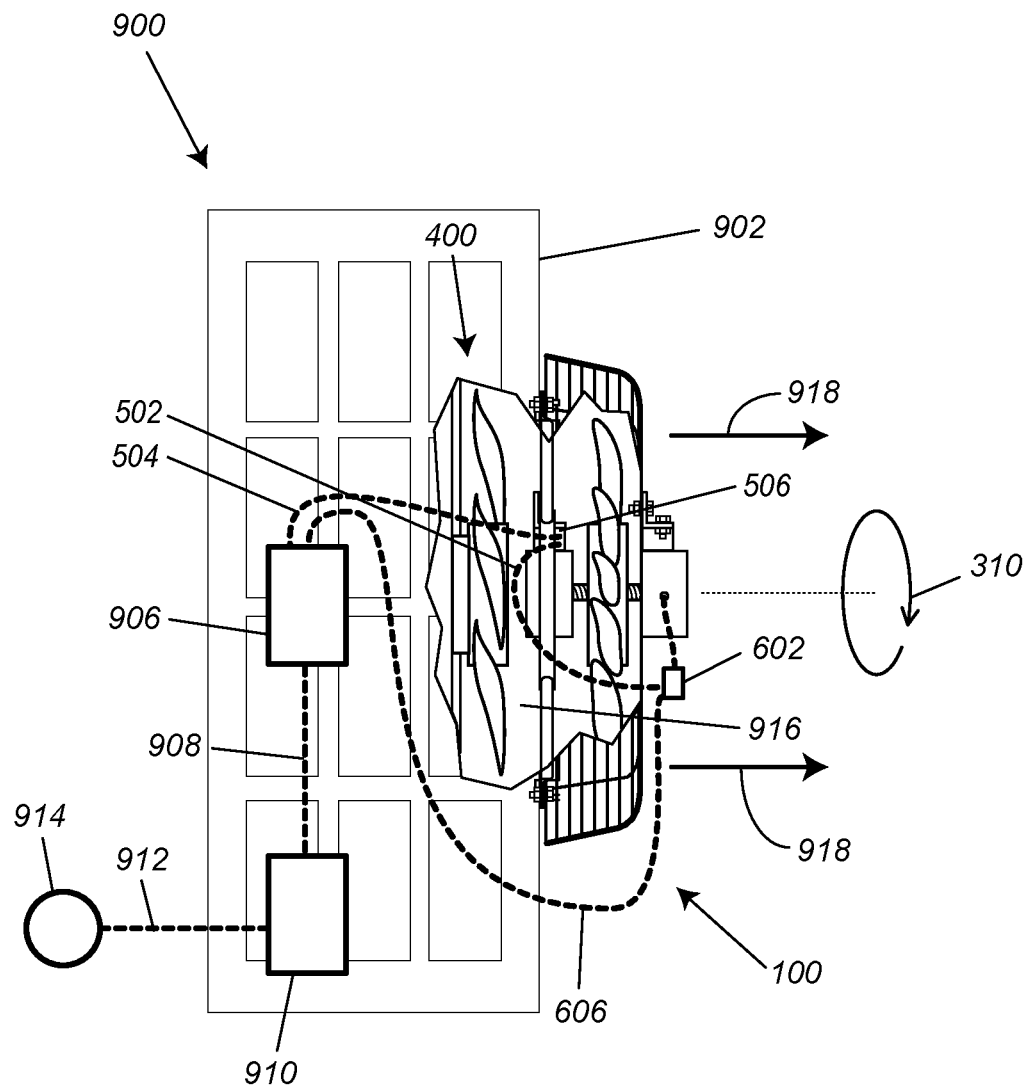
FIG. 7 is an isometric view of a waste air flow capture system installation 900 with a heat pump 902.

The installation depicted with FIG. 7 is an isometric view of a waste air flow capture system installation 900 with a heat pump 902. In this example, the waste air flow capture system 100 has been installed on the waste air flow channel 916 of a heat pump compressor 902, whereby a second fan blade assembly 400 is original equipment and therefore replacement it not needed. In some embodiments, wherein the waste air flow capture system further comprises that the HVAC compressor or a heat pump compressor comprises a second fan blade assembly configured to transmit wasted air flow from a waste air flow channel of an HVAC compressor or a heat pump compressor, wherein the second fan blade assembly is either original equipment with the HVAC compressor or the heat pump compressor or the second fan blade assembly replaces an original HVAC compressor's or heat pump compressor's exhaust fan. The air flow direction 918, which is derived from the exhaust air flow being pushed out via the gas flow channel 916 and subsequently pulled via the automotive radiator style cooling fan used as the first fan blade assembly 200 disclosed herein. In this aspect, the first side of a first fan blade assembly 300 has a clockwise rotation of 310. As illustrated, the waste air flow capture system installation 900 comprises serial wire 502, positive and negative power wires 504 and 606, rectifiers 506 and 602, battery bank 906, inverter wire 908, inverter 910 and the grid 914. In some embodiments, the first electrical generator and the second electrical generator are connected to a charge controller, rectifier, power grid, battery storage bank and/or an inverter. In some embodiments, wherein the waste air flow capture system further comprises a controller coupled to the each generator for receiving a current from each generator in parallel or in series. In some embodiments, wherein the waste air flow capture system further comprises an electrical power converter for converting DC to AC and for outputting electric power output.

Figure 8:
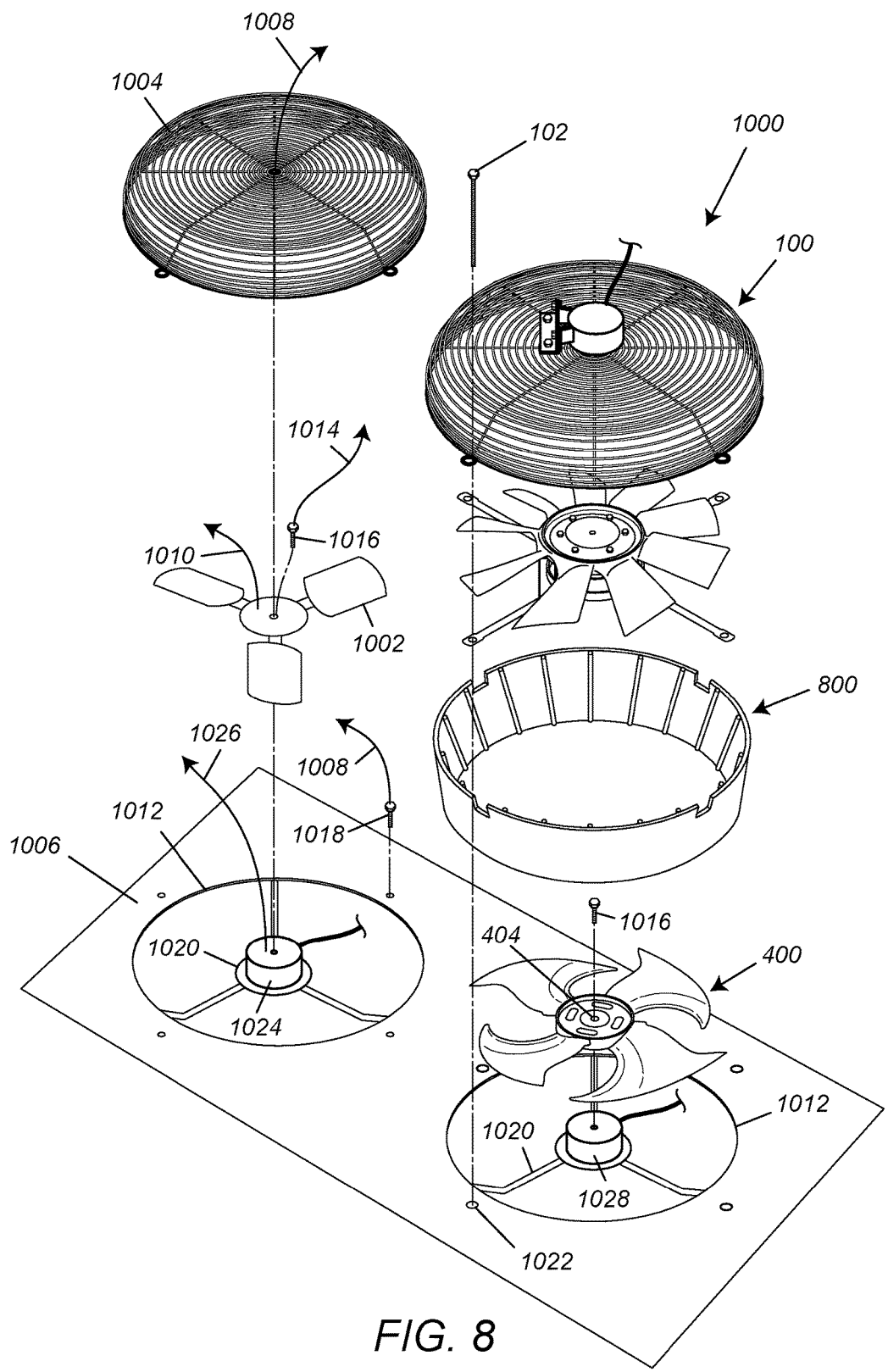
FIG. 8 is top side view of a waste air flow capture system installation 1000 with an HVAC compressor 1006.

In another example the installation depicted with FIG. 8 is top side view of a waste air flow capture system installation 1000 with an HVAC compressor 1006. In this instance the installation begins with removing 1008 the HVAC compressor's original exhaust fan shroud 1004 via bolts 1018 and removing and replacing 1010 exhaust fan 1002 via the original fan motor bracket 1020 by removing 1014 one or more fan blade bolts 1016 and the exhaust fan 1002 is replaced with the second fan blade assembly 400 disclosed herein. In some embodiments, wherein the waste air flow capture system further comprises that an HVAC compressor's or heat pump compressor's original fan shroud is removed. Next, as depicted waste air flow capture system 100 is then mounted on the waste air flow channel 1012 of the HVAC compressor with bolts 102 engaged are aligned with cylindrical shroud mounting apertures 124 and support arm mounting apertures 104 and tightened within threaded compressor apertures 1022. Moreover, the waste air flow capture system 100 may be installed in series over multiple waste air flow channels 1012. In some installations, the original compressor's fan motor 1024 is removed 1026 and replaced with a replacement fan motor 1028 for greater efficiency operating with the second fan blade assembly 400. The replacement fan motor 1028 may be an efficient ¼ hp electric motor rated between about 1100 rpm and 1725 rpm. The second fan blade assembly 400 is lighter and more efficient than the exhaust fan 1002 and therefore the original compressor's fan motor 1024 rated at about ½ hp to ¾ hp is no longer needed to efficiently rotate the second fan blade assembly 400. This raises the efficiency by reducing the amount of power needed to rotate the second fan blade assembly 400. Moreover, this also allows for an increase speed of the wasted air flow from the compressor, which results in more power being generated by the single generator or dual generator waste air flow capture system 500.

Figure 9:
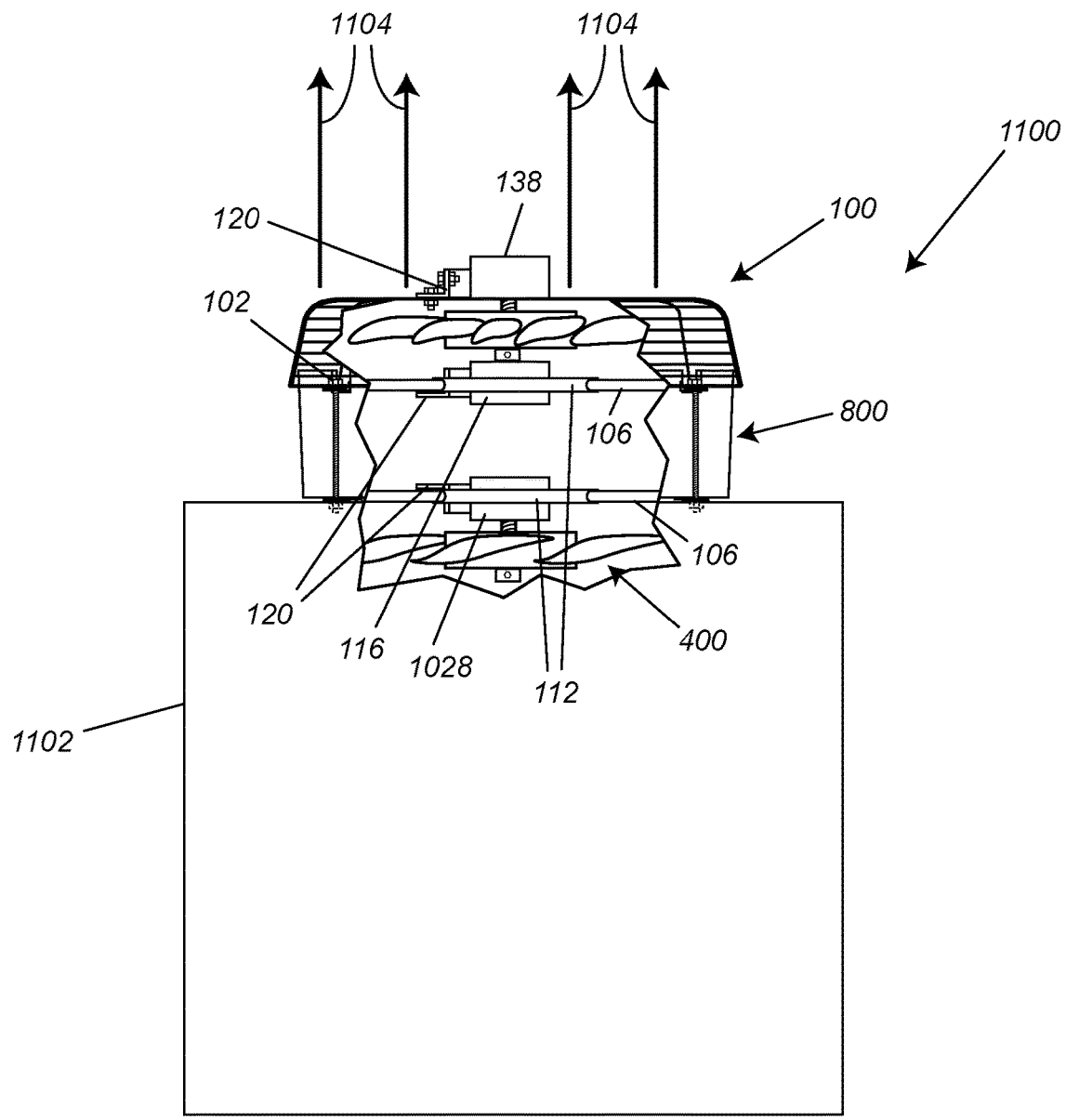
FIG. 9 is an isometric view of a waste air flow capture system installation 1100 with an HVAC compressor 1102 and including a fan shroud column 800 disclosed herein.

FIG. 9 is an isometric view of a waste air flow capture system installation 1100 with an HVAC compressor 1102 and including a fan shroud column 800 disclosed herein. The direction of the airflow 1104 is shown with this installation of a HVAC compressor 1102, whereby the original compressor's fan motor 1024 and the compressor's original fan motor bracket 1020 is replaced with the second electrical generator bracket comprises an L-bracket 108, a center ring portion 112 and a plurality of support arms 106 with replacement fan motor 1028. The original exhaust fan is replaced with the second fan blade assembly 400. Then, the fan shroud column 800 disclosed herein is engaged with the outer perimeter of waste air flow channel of an HVAC compressor and held in place between via bolts 102 tightened against the assembly and engaged and aligned with cylindrical shroud mounting apertures 124 and support arm mounting apertures 104. In some embodiments, wherein the waste air flow capture system further comprises a fan shroud column configured to fit around a fan shroud of waste air flow channel of an HVAC compressor or a heat pump compressor. In some embodiments, wherein the waste air flow capture system further comprises a fan shroud column configured to fit around a fan shroud of waste air flow channel of an HVAC compressor or a heat pump compressor, wherein the fan shroud column comprises a plurality of notches for engaging with a plurality of support arms affixed to an outer portion of a center ring of the second electrical generator bracket. Next, with the fan column notches 702 engage with the support arms 106 of the second electrical generator bracket. During operation the exhaust air 1104 is pushed by the second fan blade assembly 400 towards the first fan blade assembly 300 thereby rotating the first electrical generator motor 138 and the second electrical generator motor 116 simultaneously. Thus, the design affords the use of electrical generator motors on opposing sides of the hub of the first fan blade assembly 300, and subsequently turning this mechanical energy into electrical power during operation of the HVAC compressor 1102. Employing twin generators which can generate power either clockwise or counter clockwise places twin generators facing each other with the first fan blade assembly 300 (i.e., automotive radiator cooling fan blade) in the middle creating a single shaft turning in parallel with the two drive shafts coupled at the central axis of the hub.

With the systems and methods disclosed herein, the waste wind energy of an air conditioner compressor and heat pump compressor is used and converted into electric power and to conserve energy. In addition, the present disclosure is applicable for various types of heat dissipating or ventilating air conditioners such as air conditioners, square water cooling type water towers, erected or aslant water cooling type water towers, which can be used for the air cooling type outdoor air conditioner or air cooling type ice water cooler, etc. In some embodiments, the system is configured to be bolted onto the HVAC compressor or the heat pump compressor. The waste air flow capture system 100 is also universally sized for residential and commercial air conditioning units and heat pumps.

In another aspect, disclosed herein is a waste air flow capture system kit, comprising: a) a cylindrical shroud configured to receive a waste air flow from a waste air flow channel of an HVAC compressor or a heat pump compressor and configured to vent the waste air flow received from the waste air flow channel of an HVAC compressor or a heat pump compressor; b) a first electrical generator configured to generate electricity when a first fan blade assembly rotates relative to the cylindrical shroud; c) a second electrical generator configured to generate electricity when a first fan blade assembly rotates relative to the cylindrical shroud; d) a first fan blade assembly enclosed by the cylindrical shroud and coupled to the first electrical generator motor on a first side of the first fan blade assembly and coupled to the second electrical generator motor on a second side of the first fan blade assembly; e) a second fan blade assembly configured to transmit wasted air flow from a waste air flow channel of an HVAC compressor or a heat pump compressor; and f) a second electrical generator bracket capable of holding the second electrical generator. In some embodiments, the kit comprises the fan shroud column 800. In some embodiments, the kit comprises the second electrical generator bracket comprises an L-bracket 108, a center ring portion 112 and a plurality of support arms 106 and the replacement fan motor 1028.

In another aspect, disclosed herein is a method of passively generating electric power by recycling waste air flow received from a waste air flow channel of an HVAC compressor or a heat pump compressor with the system of claim 1, comprising the steps of: a) removing an HVAC compressor's or a heat pump compressor's fan shroud; b) replacing an HVAC compressor's or a heat pump compressor's fan blade assembly with a second fan blade assembly; c) installing a waste air flow capture system on a waste air flow channel of an HVAC compressor or a heat pump compressor, wherein a cylindrical shroud of the waste air flow capture system is facing away from the HVAC compressor or a heat pump compressor; d) using waste air flow from the channel of the HVAC compressor or the heat pump compressor to drive a first fan blade assembly and convert the wind energy into a mechanical energy which is converted further into electrical power; and e) converting the electric power with an electrical power converter for converting DC to AC and for outputting electric power output.

In another aspect, disclosed herein is a method of passively generating electric power by recycling waste air flow received from a waste air flow channel of an HVAC compressor or a heat pump compressor with the system of claim 1, comprising the steps of: a) removing an HVAC compressor's or a heat pump compressor's fan shroud; b) installing a waste air flow capture system on a waste air flow channel of an HVAC compressor or a heat pump compressor, wherein a cylindrical shroud of the waste air flow capture system is facing away from the HVAC compressor or a heat pump compressor; c) using waste air flow from the channel of the HVAC compressor or the heat pump compressor to drive a first fan blade assembly and convert the wind energy into a mechanical energy which is converted further into electrical power; and d) converting the electric power with an electrical power converter for converting DC to AC and for outputting electric power output.

In another aspect, disclosed herein is a method of passively generating electric power by recycling waste air flow received from a waste air flow channel of an HVAC compressor or a heat pump compressor with the system of claim 1, comprising the steps of: a) replacing an HVAC compressor's or a heat pump compressor's fan blade assembly with a second fan blade assembly; b) installing a fan shroud column configured to fit around a fan shroud of waste air flow channel of an HVAC compressor or a heat pump compressor; c) installing a waste air flow capture system on a waste air flow channel of an HVAC compressor or a heat pump compressor, wherein a cylindrical shroud of the waste air flow capture system is facing away from the HVAC compressor or a heat pump compressor; d) using waste air flow from the channel of the HVAC compressor or the heat pump compressor to drive a first fan blade assembly and convert the wind energy into a mechanical energy which is converted further into electrical power; and e) converting the electric power with an electrical power converter for converting DC to AC and for outputting electric power output.

In another aspect, disclosed herein is a method of passively generating electric power by recycling waste air flow received from a waste air flow channel of an HVAC compressor or a heat pump compressor with the system of claim 1, comprising the steps of: a) installing a fan shroud column configured to fit around a fan shroud of waste air flow channel of an HVAC compressor or a heat pump compressor; b) installing a waste air flow capture system on a waste air flow channel of an HVAC compressor or a heat pump compressor, wherein a cylindrical shroud of the waste air flow capture system is facing away from the HVAC compressor or a heat pump compressor; c) using waste air flow from the channel of the HVAC compressor or the heat pump compressor to drive a first fan blade assembly and convert the wind energy into a mechanical energy which is converted further into electrical power; and d) converting the electric power with an electrical power converter for converting DC to AC and for outputting electric power output.

DEFINITIONS

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or devices, which can of course vary. It is also to be understood that the terminology used herein is for the purpose of describing particular embodiments only, and is not intended to be limiting.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict any definitions in this disclosure.

What is claimed is:
1. A waste air flow capture system, comprising:
a) a cylindrical shroud configured to receive a waste air flow from a waste air flow channel of an HVAC compressor or a heat pump compressor and configured to vent the waste air flow received from the waste air flow channel of the HVAC compressor or the heat pump compressor;
b) a first electrical generator motor configured to generate electricity when a first fan blade assembly rotates relative to the cylindrical shroud and a second electrical generator motor configured to generate electricity when the first fan blade assembly rotates relative to the cylindrical shroud;
c) a first fan blade assembly enclosed by the cylindrical shroud and coupled to the first electrical generator motor on a first side of the first fan blade assembly and coupled to the second electrical generator motor on a second side of the first fan blade assembly; and
d) a second electrical generator bracket capable of holding the second electrical generator motor;
e) the second electrical generator bracket adapted to replace an original compressor fan motor and an original compressor fan motor bracket, the second electrical generator bracket comprising an L-bracket, a center ring portion and a plurality of support arms, and wherein a replacement fan motor is affixed to the L-bracket,
wherein the first fan blade assembly is configured to rotate the first electrical generator motor and the second electrical generator motor simultaneously from opposed sides of a hub of the first fan blade assembly.

2. The system of claim 1, further comprising that the first electrical generator drive shaft is coupled to a first side of the hub of the first fan blade assembly at an axial center position of the hub.

3. The system of claim 1, further comprising that the second electrical generator drive shaft is coupled to a second side of the hub of the first fan blade assembly at an axial center position of the hub.

4. The system of claim 1, further comprising that the first electrical generator motor is affixed to a top side and an axial center position of the cylindrical shroud.

5. The system of claim 1, further comprising that the HVAC compressor or a heat pump compressor comprises a second fan blade assembly configured to transmit wasted air flow from a waste air flow channel of the HVAC compressor or the heat pump compressor.

6. The system of claim 1, wherein the cylindrical shroud comprises a plurality of cylindrical shroud mounting apertures.

7. The system of claim 1, wherein the first electrical generator motor and the second electrical generator motor each independently have a rated voltage in a range between 12 volts and 48 volts.

8. The system of claim 1, further comprising that a first electrical generator drive shaft and a second electrical generator drive shaft are adjoined through a hub channel via a threaded coupling.

9. The system of claim 1, further comprising that a second electrical generator drive shaft is adjoined to the hub through a hub channel via at least one threaded coupling on a first side of the hub and/or a second side of the hub.

10. The system of claim 1, wherein the second electrical generator bracket comprises a center ring portion with a plurality of support arms affixed to the outer portion of the center ring, wherein a terminal end of one or more of the support arms comprises a support arm mounting aperture.

11. The system of claim 1, wherein the system is configured to be bolted to the waste air flow channel of the HVAC compressor or the heat pump compressor.

12. The system of claim 1, wherein the first electrical generator motor and the second electrical generator motor each independently have an output between about 100 W/h to 500 W/h.

13. The system of claim 1, wherein the first electrical generator motor and the second electrical generator motor are connected in series or in parallel.

14. The system of claim 1, wherein the first electrical generator motor and/or the second electrical generator motor are connected to a charge controller, rectifier, power grid, battery storage bank and/or an inverter.

15. The system of claim 1, wherein the first electrical generator motor and the second electrical generator motor each comprises an alternating current, magnet, drive shaft, bearings, insulators and power wire terminals.

16. The system of claim 1, further comprising an electrical power converter for converting DC to AC and for outputting electric power output.

17. The system of claim 1, further comprising a fan shroud column configured to fit around the waste air flow channel of the HVAC compressor or the heat pump compressor, wherein the fan shroud column comprises a plurality of notches for engaging with a plurality of support arms affixed to an outer portion of a center ring of the second electrical generator bracket.

18. A waste air flow capture system kit, comprising:
a) a cylindrical shroud configured to receive a waste air flow from a waste air flow channel of an HVAC compressor or a heat pump compressor and configured to vent the waste air flow received from the waste air flow channel of the HVAC compressor or the heat pump compressor;
b) a first electrical generator motor configured to generate electricity when a first fan blade assembly rotates relative to the cylindrical shroud and a second electrical generator motor configured to generate electricity when the first fan blade assembly rotates relative to the cylindrical shroud;
c) the first fan blade assembly enclosed by the cylindrical shroud and coupled to the first electrical generator motor on a first side of the first fan blade assembly and coupled to the second electrical generator motor on a second side of the first fan blade assembly;
d) a second fan blade assembly configured to transmit waste air flow from the waste air flow channel of a the HVAC compressor or the heat pump compressor; and
e) a second electrical generator bracket capable of holding the second electrical generator motor, said second electrical generator bracket being adapted to replace an original compressor fan motor and an original compressor fan motor bracket, the second electrical generator bracket comprising an L-bracket, a center ring portion and a plurality of support arms, and wherein a replacement fan motor is affixed to the L-bracket.

19. A method of passively generating electric power by recycling waste air flow received from a waste air flow channel of an HVAC compressor or a heat pump compressor with the system of claim 1, comprising the steps of:
(a) removing an HVAC compressor's or a heat pump compressor's fan shroud;
(b) replacing the HVAC compressor's or the heat pump compressor's fan blade assembly with a second fan blade assembly;
(c) replacing an original compressor fan motor and an original compressor fan motor bracket with a second electrical generator bracket comprising an L-bracket, a center ring portion and a plurality of support arms, and wherein a replacement fan motor is affixed to the L-bracket,
(d) installing a waste air flow capture system on a waste air flow channel of an HVAC compressor or a heat pump compressor, wherein a cylindrical shroud of the waste air flow capture system is facing away from the HVAC compressor or a heat pump compressor;
(e) using waste air flow from the channel of the HVAC compressor or the heat pump compressor to drive a first fan blade assembly and convert the wind energy into a mechanical energy which is converted further into electrical power; and
(f) converting the electric power with an electrical power converter for converting DC to AC and for outputting electric power output.

* * * * *